(12) United States Patent
Billard (10) Patent No.: US 10,189,419 B2
(45) Date of Patent: Jan. 29, 2019

(54) CARGO CARRIER AND METHOD OF USING SAME

(71) Applicant: Stephane Billard, Duhamel-Ouest (CA)

(72) Inventor: Stephane Billard, Duhamel-Ouest (CA)

( * ) Notice: Subject to any disclaimer, the term of this patent is extended or adjusted under 35 U.S.C. 154(b) by 0 days.

(21) Appl. No.: 15/357,286

(22) Filed: Nov. 21, 2016

(65) Prior Publication Data

US 2017/0144611 A1 May 25, 2017

(30) Foreign Application Priority Data

Nov. 21, 2015 (GB) .................................. 1520624.6

(51) Int. Cl.
*B60R 9/06* (2006.01)
*B62D 43/02* (2006.01)

(52) U.S. Cl.
CPC .............. *B60R 9/065* (2013.01); *B62D 43/02* (2013.01)

(58) Field of Classification Search
CPC B60R 9/065; B60R 9/06; B62D 43/02; B60P 1/4421; B60P 1/4442; B62B 2203/10; B62B 5/0003; A61G 3/062
USPC ..................................... 414/462–466, 10–12
See application file for complete search history.

(56) References Cited

U.S. PATENT DOCUMENTS

| | | | |
|---|---|---|---|
| 3,799,379 A * | 3/1974 | Grether | B66F 9/07563 187/222 |
| 4,178,011 A | 12/1979 | Kirsch | |
| 4,466,632 A | 8/1984 | Devorak | |
| 4,807,899 A | 2/1989 | Belcher | |
| 5,048,854 A | 9/1991 | Clark | |
| 5,413,366 A * | 5/1995 | Gibbons | B60D 1/46 280/490.1 |
| 5,449,031 A | 9/1995 | Burklund | |
| 5,707,200 A * | 1/1998 | Liu | B62B 5/0003 187/233 |
| 5,931,362 A | 8/1999 | Chimenti | |
| 5,984,613 A | 11/1999 | Motilewa | |
| 6,105,843 A * | 8/2000 | Dollesin | B60R 9/065 224/495 |
| 6,164,896 A | 12/2000 | Cummins | |
| 6,361,264 B1 | 3/2002 | Guthrie et al. | |
| 6,494,477 B1 | 12/2002 | Parker | |
| 6,698,995 B1 | 3/2004 | Bik | |
| 7,101,142 B2 | 9/2006 | Bik | |
| 7,798,760 B2 | 9/2010 | Strassman | |
| 8,201,843 B2 | 6/2012 | Neu | |
| 8,777,070 B2 | 7/2014 | Moore et al. | |
| 2006/0045677 A1* | 3/2006 | Garfield | A45C 13/385 414/340 |

(Continued)

FOREIGN PATENT DOCUMENTS

EP 2641758 9/2013

*Primary Examiner* — Lyn E Schwenning (57) ABSTRACT

A cargo carrier attachable to a trailer hitch receiver, the cargo carrier comprising a hitch adapter mountable to the trailer hitch receiver; a mounting element; and a cargo receiving portion secured to the mounting element. The mounting element includes a movable element and an actuator, the movable element being removably mountable to the hitch adapter, the movable element being selectively movable relative to the cargo receiving portion between lower and upper positions, the actuator being operatively coupled to the movable element for moving the movable element between the lower and upper positions.

17 Claims, 3 Drawing Sheets

(56) References Cited

U.S. PATENT DOCUMENTS

| | | | |
|---|---|---|---|
| 2006/0228201 A1* | 10/2006 | Lenceski | A63B 71/0036 |
| | | | 414/466 |
| 2008/0044269 A1* | 2/2008 | Pradenas | B60P 3/07 |
| | | | 414/462 |
| 2008/0101899 A1 | 5/2008 | Slonecker | |
| 2009/0028679 A1 | 1/2009 | Smith | |
| 2014/0308101 A1* | 10/2014 | Brutsaert | B60R 9/06 |
| | | | 414/462 |
| 2014/0312584 A1* | 10/2014 | Zhang | B62B 1/12 |
| | | | 280/47.29 |
| 2014/0375040 A1* | 12/2014 | Rhodes | B60R 9/065 |
| | | | 280/769 |
| 2015/0050107 A1* | 2/2015 | Kipp | B60P 1/02 |
| | | | 414/462 |
| 2016/0039353 A1* | 2/2016 | Seaburg, Sr. | B65F 1/1468 |
| | | | 414/462 |

* cited by examiner

FIG. 13

CARGO CARRIER AND METHOD OF USING SAME

FIELD OF THE INVENTION

The present invention relates generally to cargo carriers and, more particularly, to a cargo carrier mountable outside of a vehicle.

BACKGROUND

Racks and other cargo carriers securable to a vehicle are commonly used to carry various items. However, these carriers typically require that the cargo be lifted in position on the rack or carrier. For smaller or weaker users, this can be very problematic. Also, the same problem occurs even when a relatively heavy item is to be carried in the trunk of a car or other similar vehicle.

In view of the above, there is a need in the industry for an improved cargo carrier.

An object of the present invention is to provide such an improved cargo carrier and a method of using the same.

SUMMARY OF THE INVENTION

In a broad aspect, the present invention provides a cargo carrier attachable to a trailer hitch receiver, the cargo carrier comprising: a hitch adapter mountable to the trailer hitch receiver; a mounting element; and a cargo receiving portion secured to the mounting element. The mounting element includes a movable element and an actuator, the movable element being removably mountable to the hitch adapter, the movable element being selectively movable relative to the cargo receiving portion between lower and upper positions, the actuator being operatively coupled to the movable element for moving the movable element between the lower and upper positions. With the movable element mounted to the hitch adapter, moving the movable element between the upper and lower positions raises and lowers the cargo receiving portion relative to the hitch adapter.

Advantageously, the proposed cargo carrier can be lifted from the ground to be carried by a vehicle without requiring the intended user of the cargo carrier to exert a large force thereonto as the intended user can use the actuator to perform this operation. In some embodiments, the actuator is motorized and thus requires almost no effort to operate. In other embodiments, a force demultiplication, provided for example through gears or levers, allows the intended user to perform this operation while exerting a smaller force than would be needed if the intended user had to lift the cargo contained in the cargo carrier.

The invention may also provide a cargo carrier wherein the hitch adapter defines an adapter protruding portion and the movable element defines a cavity configured and sized for receiving at least partially the adapter protruding portion thereinto.

The invention may also provide a cargo carrier wherein the movable element defines a lower aperture leading into the cavity from below, the adapter protruding portion being inserted in the cavity through the lower aperture and the hitch adapter and movable element abutting against each other when the movable element is operatively mounted to the hitch adapter.

The invention may also provide a cargo carrier wherein the movable element also defines an upper aperture leading into the cavity from above, the adapter protruding portion protruding from the cavity through the upper aperture when the movable element is operatively mounted to the hitch adapter.

The invention may also provide a cargo carrier further comprising a lock selectively lockable for maintaining the adapter protruding portion protruding from the upper aperture.

The invention may also provide a cargo carrier wherein the hitch adapter includes a hitch engaging member mountable to the trailer hitch receiver and extending from the adapter protruding portion, and wherein the adapter protruding portion includes a substantially vertical tongue.

The invention may also provide a cargo carrier wherein the substantially vertical tongue defines a substantially planar main portion and a curved upper edge portion extending from the main portion curving out-of-plane relative to the main portion.

The invention may also provide a cargo carrier wherein the mounting element also includes a guide rail, the movable element being movable along the guide rail to move between the upper and lower positions.

The invention may also provide a cargo carrier wherein the guide rail is substantially vertically extending.

The invention may also provide a cargo carrier wherein the movable element is mounted to the guide rail so as to be slidable therealong.

The invention may also provide a cargo carrier wherein the guide rail includes a pair of substantially parallel rail members and the movable element includes a pair of collars, each collar being slidably received on a respective one of the rail members.

The invention may also provide a cargo carrier wherein the actuator includes a substantially vertical endless screw substantially vertically fixed relative to the guide rail; and the movable element defines a threaded bore, the endless screw being mounted in the threaded bore. Rotating the endless screw moves the movable element between the upper and lower positions.

The invention may also provide a cargo carrier wherein the actuator also includes a crank handle operatively coupled to the endless screw for rotating the endless screw when the crank handle is turned.

The invention may also provide a cargo carrier wherein the cargo receiving portion includes a wheeled cabinet.

The invention may also provide a cargo carrier wherein the wheeled cabinet includes a pair of laterally openable wing doors provided opposed to the mounting element.

The invention may also provide a cargo carrier wherein the wheeled cabinet includes a drawer provided below the wing doors.

The invention may also provide a cargo carrier wherein the cargo receiving portion defines a set of substantially horizontal shelves provided one above the others.

In another broad aspect, the invention provides a method of attaching a cargo carrier to a hitch adapter mounted to a trailer hitch receiver of a vehicle, the cargo carrier having a mounting element and a cargo receiving portion secured to the mounting element, the mounting element including a movable element removably mountable to the hitch adapter, the movable element being movable relative to the cargo receiving portion between lower and upper positions, the method comprising: positioning the cargo carrier and the vehicle so that the cargo carrier and the hitch adapter are substantially adjacent to each other; mounting the movable element to the hitch adapter; and raising the cargo receiving portion relative to the movable element by moving the movable element and the cargo receiving portion relative to each other so that the movable element gets closer to a lower end of the cargo receiving portion.

The invention may also provide a method wherein the hitch adapter defines an adapter protruding portion protruding upwardly and the movable element defines a cavity and a lower aperture leading into the cavity from below; positioning the cargo carrier and the vehicle includes positioning the cargo carrier and the vehicle such that the lower aperture is above and substantially in register with the adapter protruding portion; and mounting the movable element to the hitch adapter includes lowering the movable element until the adapter protruding portion is at least in part received in the cavity and the movable element and hitch adapter abut against each other so that the hitch adapter supports the movable element.

The present application claims benefit from UK request application 1520624.6 filed Nov. 21, 2015, the contents of which is hereby incorporated by reference in its entirety.

Other objects, advantages and features of the present invention will become more apparent upon reading of the following non-restrictive description of some embodiments thereof, given by way of example only with reference to the accompanying drawings.

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art. Also, directional terminology, such as top and bottom, refers to the cargo carrier of the invention supported upstanding on the ground. This reference configuration is used for reference and convenience purposes and should not be used to restrict the scope of the claims unless explicitly required by the structure of a specific claim.

Figure 9:
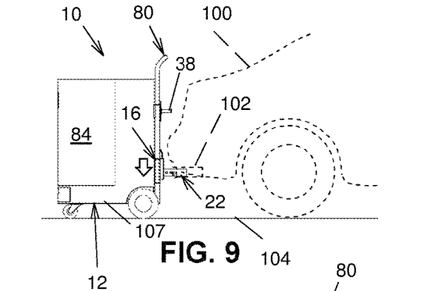
FIG. 9, in a side elevational views, illustrates a third step of the method of using the cargo carrier of FIG. 1.
Figure 10:
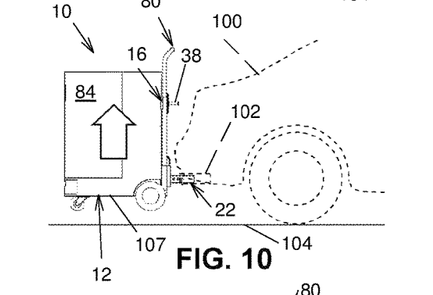
FIG. 10, in a side elevational views, illustrates a fourth step of the method of using the cargo carrier of FIG. 1.

FIGS. 1 to 13 illustrate an embodiment of a cargo carrier 10, according to the present invention, that is attachable to the trailer hitch receiver 102, also called a tow hitch receiver, of a vehicle 100 for carrying a cargo load (such as illustrated in FIG. 10).

Figure 1:
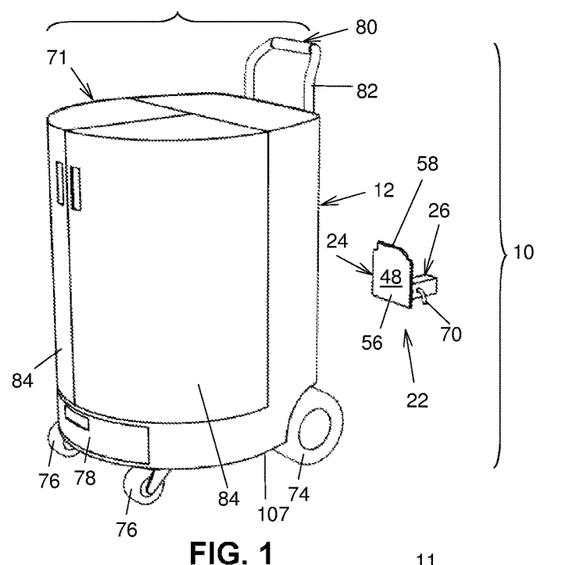
FIG. 1, in a perspective view, illustrates an embodiment of a cargo carrier, according to the present invention.
Figure 2:
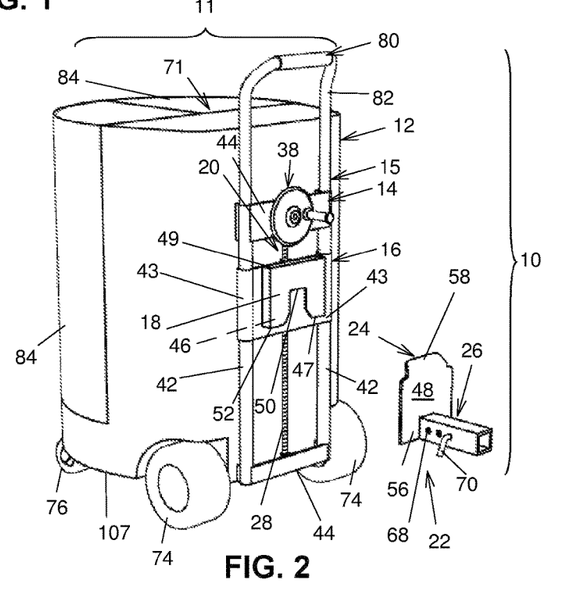
FIG. 2, in an alternative perspective view, illustrates the cargo carrier of FIG. 1.

Now referring for example to FIGS. 1 and 2, the cargo carrier 10 comprises a transport component 11 and a hitch adapter 22 mountable to the trailer hitch receiver 102 (not shown in FIGS. 1 and 2). The transport component 11 comprises a cargo receiving portion 12 configured and sized for carrying a cargo load (not shown in FIGS. 1 and 2) and a mounting element 14, better seen in FIG. 2, secured of the cargo receiving portion 12, for example through soldering, welding, an adhesive or fasteners, among other possibilities. Typically, the mounting element 14 is permanently secured to the cargo receiving portion 12. Permanently secured for the purpose of the present documents signifies that no mechanism for easily detaching from each other elements that are thus permanently secured in common operation is provided. For example, elements that are secured to each other using a standard Philips head screw are for this purpose permanently secured to each other. Elements that are welded or glued to each others are also permanently secured to each other.

The mounting element 14 includes a movable element 16 and an actuator 20. The movable element 16 is removably mountable to the hitch adapter 22 through a movable element engaging portion 18. The movable element 16 is selectively movable relative to the cargo receiving portion 12 between lower and upper positions, shown respectively in FIGS. 7 and 10. The actuator 20 is operatively coupled to the movable element 16 for moving the movable element 16 between the lower and upper positions.

With the movable element 16 mounted to the hitch adapter 22, moving the movable element between the upper and lower positions raises and lowers the cargo receiving portion 12 relative to the hitch adapter 22, as illustrated in FIGS. 7 to 10.

Returning to FIG. 2 for example, in some embodiments, the mounting element 14 also includes a guide rail 15, the movable element 16 being movable along the guide rail 15 to move between the upper and lower positions. Typically, but not necessarily, the guide rail 15 is substantially vertically extending. Also typically, but not necessarily, the movable element 16 is mounted to the guide rail 15 so as to be slidable therealong. However, for example, the movable element 16 may roll along the guide rail 15 in other embodiments.

In a specific and non-limiting embodiment of the invention, the guide rail 15 includes a pair of substantially parallel rail members 42, for example elongated rectilinear tubular members of round transversal cross-section. In these embodiments, the movable element 16 includes for example a pair of collars 43, each collar 43 being slidably received on a respective one of the rail members 42.

In this embodiment, the actuator 20 may be operatively coupled between the guide rail 15 and the movable element 16 for user selectively moving the movable element 16 between the upper position and the lower position.

In a specific embodiment of the invention, the hitch adapter 22 includes an adapter protruding portion 24 and the movable element 16 defines a cavity 46 configured and sized for receiving at least partially the adapter protruding portion 24 thereinto. The hitch adapter 22 further includes a hitch engaging member 26 extending for example substantially horizontally from the adapter protruding portion 24. The hitch engaging member 26 is suitably configured and sized for engaging the vehicle trailer hitch receiver 102.

Figure 7:
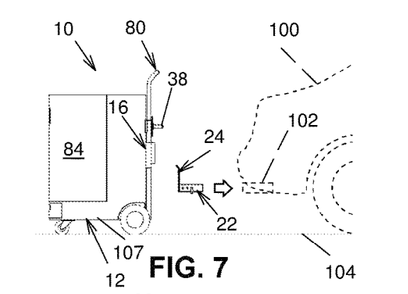
FIG. 7, in a side elevational views, illustrates a first step of a method of using the cargo carrier of FIG. 1.
Figure 8:
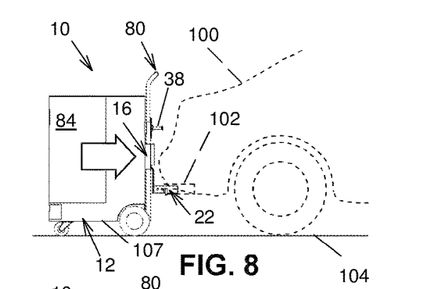
FIG. 8, in a side elevational views, illustrates a second step of the method of using the cargo carrier of FIG. 1.

A method of use of the cargo carrier 10 of the present invention will now be described. In a first step, as seen in FIG. 7 and when required, the hitch adapter 22 is mounted on the trailer hitch receiver 102. In a second step, as seen in FIG. 8, with the movable element 16 already positioned in the upper position, or at least above the adapter protruding portion 24, the method includes positioning the cargo carrier 10 adjacent to the hitch adapter 22. For example, in embodiments in which the adapter protruding portion 24 protrudes upwardly and the cavity 46 is opened at its lower end, the cargo carrier 10 is positioned so that the cavity 46 is above and substantially in register with the adapter protruding portion 24. Alternatively, the vehicle 100 may be positioned so as to have the adapter protruding portion 24 substantially in register under the cavity 46.

In a third step, as seen in FIG. 9, the method includes mounting the movable element 16 to the hitch adapter 22. This is performed for example by operating the actuator 20 so as to lower the movable element engaging portion 18, first, in a locking engagement with the adapter protruding portion 24 so that the latter is received at least partially in the cavity 46, followed with the cargo receiving portion 12 being lifted substantially upwardly in a spaced apart relationship relative to a support surface 104, as seen in FIG. 10. This latter step is performed by simply continuing operation of the actuator 20, which will allow this lifting operation once the adapter protruding portion 24 is engaged in the cavity 46. Thus, raising the cargo receiving portion 12 relative to the movable element 16 is performed by moving the movable element 16 and the cargo receiving portion 12 relative to each other so that the movable element 16 gets closer to a lower end 107 of the cargo receiving portion 12.

To disengage the movable element engaging portion 18 from the adapter protruding portion 24, in order to separate the transport component 11 from the vehicle 100, the method essentially consist in operating the actuator 20 so as to raise the movable element 16 relative to the cargo receiving portion 12, until, first, the cargo receiving portion 12 rest on the support surface 104, followed with the movable element 16 being disengaged from the adapter protruding portion 24 though its continuous upward movement.

Figure 3:
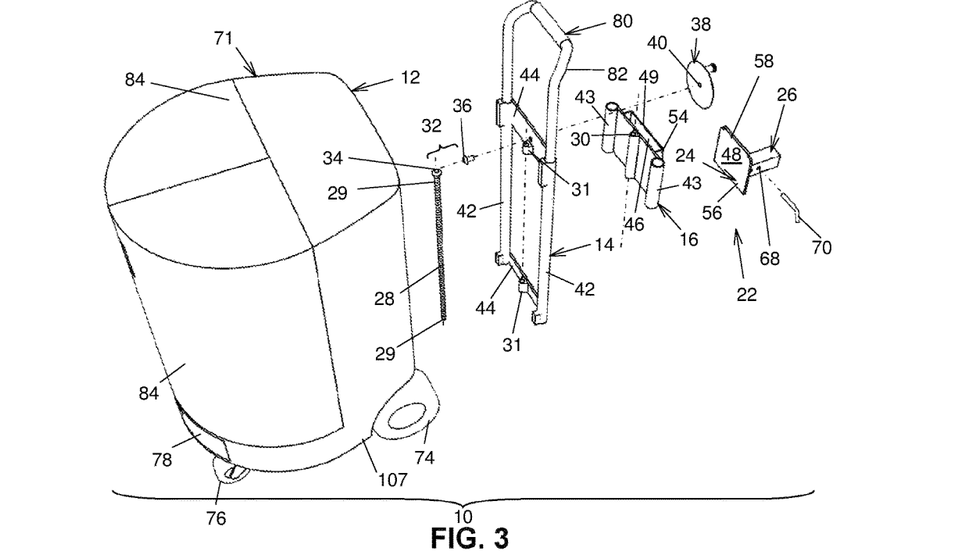
FIG. 3, in an exploded perspective view, illustrates the cargo carrier of FIG. 1.
Figure 4:
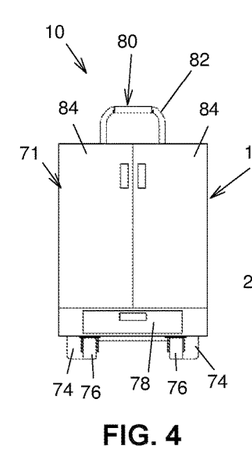
FIG. 4, in a rear elevational view, illustrates the cargo carrier of FIG. 1.

In some embodiments, as illustrated in FIG. 3 for example, the actuator 20 includes a substantially elongated endless screw 28 having opposed end portions 29 thereof rotatably mounted in vertically spaced apart portions 31 of the mounting element 14 so as to extend substantially vertical, longitudinally parallelly relative to the rail members 42. The endless screw 28 is substantially vertically fixed relative to the guide rail 15. Typically, the endless screw 28 is only allowed to rotate along its longitudinal axis, all other movements of the endless screw relative to the guide rail 15 being prevented.

Furthermore, the endless screw 28 has an intermediate portion thereof, between the end portions 29 mounted and threadedly engaged in a threaded bore 30 extending throughout a vertical portion of the movable element 16. Thus, rotating the endless screw 28 moves the movable element 16 between the upper and lower positions. For example, the actuator 20 also includes a crank handle 38 operatively coupled to the endless screw 28 for rotating the endless screw 28 when the crank handle 38 is turned.

In some embodiments, the actuator 20 further includes a right angle bevel gear assembly 32 having a bevel gear assembly output shaft 34 coupled to the upper end portion 29 of the endless screw 28 and a bevel gear assembly input shaft 36 extending substantially horizontally and protruding away from the cargo receiving portion 12. The crank handle 38 has a central hub 40 thereof mounted on the bevel gear assembly input shaft 36 for user selectively rotating the endless screw 28 in a forward and a reverse direction using the crank handle 38.

It is to be understood that other known configurations for operatively coupling the crank handle 38 to the endless screw 28, with or without a right angle bevel gear assembly 32, are also possible.

In some other embodiments (not shown in the drawings), instead of the bevel gear assembly 32 and the crank handle 38, the actuator 20 includes an electric motor assembly electrically coupled to an electric power source of the vehicle 100 and having an output shaft thereof operatively coupled to one of the opposed end portions 29 of the endless screw 28 for rotating the latter when the electric motor is activated. The electric motor assembly further includes a suitable user control interface for selectively rotating the endless screw 28 in a forward and a reverse direction.

As would be obvious for someone familiar with electrically operated cargo lift and transport devices of the prior art, the motor actuator 20 may have its output shaft operatively coupled directly coupled to, or otherwise through a suitable gear box to, the upper or lower end of the endless screw 28, or to an intermediate portion thereof. The user control interface may be mounted at a separate, more convenient position along, for example, a top portion of the transport component 11.

In some embodiments, rail members 42 have end portions thereof linked to one another through a pair of guide rail transversal members 44. Furthermore, the movable element 16 extends transversally between the pair of rail members 42 and the collars 43 are provided on opposed lateral end portions thereof.

In some other embodiments, as mentioned hereinabove, the movable element engaging portion 18 defines the cavity 46 (as illustrated in FIG. 2), which extends substantially inwardly upwardly relative to a lower end thereof. To that effect, the movable element 16 defines a lower aperture 47 leading into the cavity 46 from below. The adapter protruding portion 24 is inserted in the cavity 46 through the lower aperture 47 when the movable element 16 is operatively mounted to the hitch adapter 22.

Furthermore, the adapter protruding portion 24 includes a tongue 48. For example, the adapter protruding portion 24 takes the form of a tongue 48 defining a substantially planar main portion 56 and a curved upper edge portion 58 extending from the main portion 56 and curving out-of-plane relative to the main portion 56. In other words, the curved upper edge portion 58 is not contained in plane defined by the main portion 56. The main portion 56 is for example provided at the end of the hitch adapter 22 opposed to the trailer hitch receiver 102. The adapter protruding portion 24 is suitably configured and sized for upwardly slidably engaging the cavity 46.

In some other embodiments, the movable element engaging portion 18 may further define a recess 50 extending at least partially upwardly relative to a lower edge portion 52 of the engaging cavity 46 that is in register with the hitch engaging member 26 when the movable element engaging portion 18 is engaged with the adapter protruding portion 24.

Furthermore, the recess 50 is configured and sized for at least partially engaging an upper transversal portion of the hitch engaging member 26.

In a substantially inverted configuration, compared to the previously described embodiment, in some other embodiments (not shown in the drawings), the movable element engaging portion 18 has an engaging tongue extending substantially downwardly distally relative thereof. Furthermore, the adapter protruding portion 24 defines an engaging cavity extending substantially inwardly downwardly relative to an upper portion thereof. Furthermore, the engaging cavity is configured and sized for upwardly slidably engaging the engaging tongue.

Figure 5:
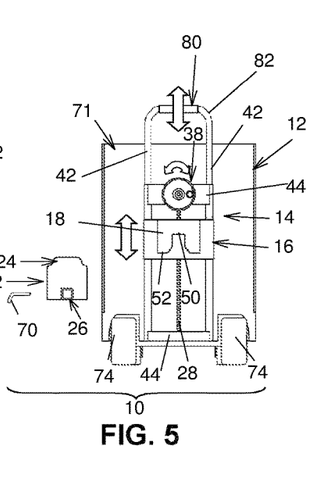
FIG. 5, in a front elevational view, illustrates the cargo carrier of FIG. 1.
Figure 6:
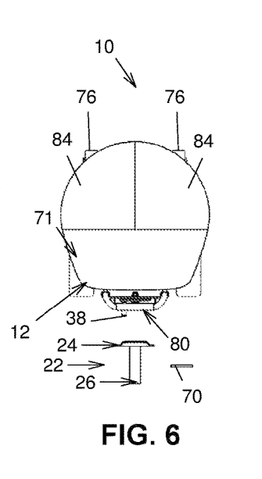
FIG. 6, in a top plan view, illustrates the cargo carrier of FIG. 1.

For example, in some embodiments and as seen in FIG. 5, the movable element engaging portion 18 is a vertically extending tubular member 54, with the engaging cavity 46 being represented by a passageway extending vertically throughout. The tubular member 54 has for example a substantially rectangular cross-section extending transversally centrally relative to the hitch engaging member 26. In such embodiments, the movable element 16 also defines an upper aperture 49 leading into the cavity 46 from above.

Furthermore, the tongue 48 is represented by a plate member disposed transversally centrally relative to the hitch engaging member 26 and configured and sized for engaging the rectangular shaped passageway extending vertically throughout the tubular member 54. In some other embodiments, the leading edge portion 58 is at least slightly curved either towards the cargo receiving portion 12 or the hitch engaging member 26.

Thus, the substantially curved configuration of the leading edge portion 58 requires significantly less precision in the vertical alignment of the movable element engaging portion 18 above the adapter protruding portion 24 prior to lowering the movable element engaging portion 18 onto the adapter protruding portion 24 for the interlocking engagement therebetween.

Figure 13:
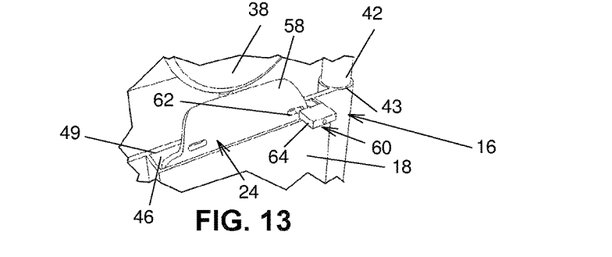
FIG. 13, in a fragmented view, illustrates a lock present in some embodiments of the cargo carrier of FIG. 1.

In some embodiments, as best illustrated in FIG. 13, the adapter protruding portion 24 protrudes from the cavity 46 through the upper aperture 49 when the movable element 16 is operatively mounted to the hitch adapter 22. A lock 60 is selectively lockable for maintaining the adapter protruding portion 24 protruding from the upper aperture 49, which thus locks the adapter protruding portion 24 in the cavity 46.

For example, the tongue 48 may have a sufficient vertical dimension so as to have the leading edge portion 58 thereof at least slightly protruding from the cavity 46. Furthermore, at least one aperture 62 defined through the leading edge portion 58 may allow a user to selectively insert a padlock 64 or the like therethrough so as to lockingly secure the adapter protruding portion 24 in the cavity 46. Thus, a user may travel with a vehicle 100 equipped with the cargo carrier 10 of the present invention and stop at shopping malls, restaurants and the likes without having to worry about theft. Other known configurations for a lock 60 between the movable element engaging portion 18 and the adapter protruding portion 24 are also possible.

In some other embodiments, as seen for example in FIG. 2, the hitch engaging member 26 is a tubular member having a substantially square shaped cross-section and defining a plurality of paired sets of apertures 68 extending transversally throughout. Furthermore, the hitch engaging member 26 is configured and sized for adjustably and lockingly engaging the vehicle trailer hitch receiver 102, also defining at least one paired set of transversal apertures, using a suitable lock pin 70 or the like. Other known configurations of the hitch engaging member 26 compatible with other configurations of vehicle trailer hitch receiver 102 are also possible.

In some embodiments, the cargo receiving portion 12 includes a wheeled cabinet 71. It is to be noted that other known configurations for the cargo receiving portion 12 are also possible, such as, for example, a simple horizontal platform, a dolly with a fastening strap typically configured and used for carrying kitchen appliances such as a refrigerator, a stove or the like.

Figure 11:
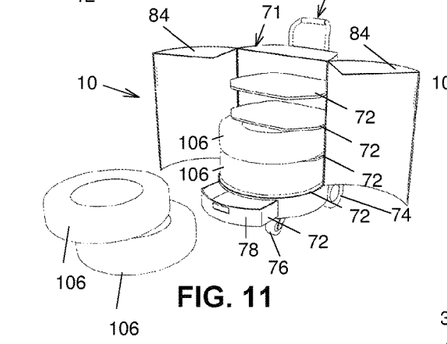
FIG. 11, in a perspective views, illustrates the cargo carrier of FIG. 1, here shown containing two vehicle tires and having wing doors thereof in a substantially open configuration.
Figure 12:
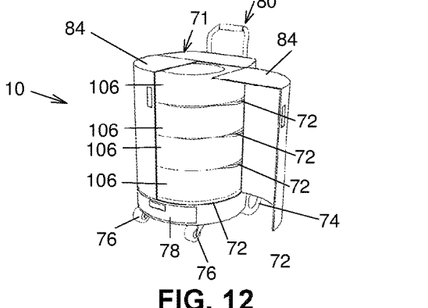
FIG. 12, in a perspective views, illustrates the cargo carrier of FIG. 1, containing four vehicle tires and having its wing doors in a substantially half open configuration.

The wheeled cabinet 71 is may be for example a selectively reclosable cabinet having a suitable configuration and size for storing a set of four vehicle tires 106 oriented sideways on a set of substantially horizontal shelves 72 provided one above the others, as seen in FIGS. 11 and 12.

The wheel configuration of the wheeled cabinet 71 is for example, as illustrated in the figures, a pair of wheels 74 mounted on a transversal axis positioned substantially adjacent a lower end portion of the guide rail 15, and a pair of caster wheels 76 positioned in a spaced apart relation relative thereto.

Conveniently, the wheeled cabinet 71 may be provided with additional compartments such as a bottom drawer 78 for storing therein other vehicle related articles and accessories associated with the change of seasons such as winter windshield wiper blades, windshield hand scrapers, winter gloves and the likes.

In some other embodiments, as illustrated in the figures, the cargo carrier 10 further comprises a handle 80 extending from an upper portion of the transport component 11, for manually moving around the latter when detached from the hitch adapter 22.

Advantageously, as best illustrated in FIG. 5, the handle 80 may be represented by a handle assembly 82 having an inverted U-shaped configuration extending telescopically out of the paired upper ends of the rail members 42 of the guide rail 15. Other known configurations for the handle 80 are also possible.

In some other embodiments, as illustrated in the figures, the wheeled cabinet 71 is reclosable through a pair of laterally openable wing doors 84 or equivalent provided opposed to the mounting element 14. As would be obvious to someone familiar in the art, other known configurations of doors for a wheeled cabinet 71 are also possible. For example, the pair of laterally openable wing doors 84 may be replaced by a unitary piece shell cover removably attached along the edges of a main aperture of the wheeled cabinet 71 through suitable clamps. Alternatively, the pair of laterally openable wing doors 84 may be replaced by a slide door openable laterally from one side and around the back of the wheeled cabinet 71. Alternatively, the pair of laterally openable wing doors 84 may be replaced with a stretchable or accordion like curtain made of a fabric or a polymeric sheet attachable in a closed configuration using suitable hook members, snap buttons, Velcro® pads, or the like.

As would be obvious to someone familiar with known cargo lift and transport devices mountable on a vehicle, selected components of the cargo carrier 10 such as, for example, the guide rail 15, the movable element 16 and the hitch adapter 22, may be made of sufficiently rigid, yet relatively light metal, such as aluminum, a light steel, a suitable metal alloy having a similar rigidity and light weight ratio, or a combination thereof. Furthermore, the cargo carrier 10 may be suitably configured and sized for a given application and weight of the target cargo load it may carry.

Advantageously, a user of the cargo carrier 10 who has limited strength and dexterity is only required the relatively light efforts involving the installation of the relatively small and light hitch adapter 22 on the vehicle trailer hitch receiver 102, operating the vehicle 100 for positioning the adapter protruding portion 24 substantially under the movable element engaging portion 18, followed with operating the actuator 20 to lift the cargo support assembly off the ground, in order to successfully move a relatively heavy cargo content using the present invention.

Thus, further advantageously, as exemplified in the drawings, a convenient usage of the cargo carrier 10 by an aging and slightly frail, yet autonomous person, may be for transport and storage purposes of a set of season tires 106 between a residential home and a vehicle maintenance shop where they are exchanged with the ones on the vehicle 100 twice a year in seasoned countries.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A cargo carrier attachable to a trailer hitch receiver and having a weight, the cargo carrier comprising:
   a hitch adapter mountable to the trailer hitch receiver;
   a mount; and
   a cargo receptacle secured to the mount;
   wherein the mount includes a carriage and an actuator, the carriage being removably mountable to the hitch adapter, the carriage being selectively movable relative to the cargo receptacle between lower and upper positions, the actuator being operatively coupled to the carriage for moving the carriage between the lower and upper positions;
   wherein the hitch adapter defines an adapter protruding portion and the carriage defines a cavity configured and sized for receiving at least partially the adapter protruding portion thereinto;
   wherein the carriage defines a lower aperture leading into the cavity from below, the adapter protruding portion being inserted in the cavity through the lower aperture, the carriage abutting vertically against the hitch adapter when the carriage is operatively mounted to the hitch adapter so that the weight of the cargo carrier is supported by the hitch adapter through vertical abutment of the carriage against the hitch adapter;
   whereby, with the carriage mounted to the hitch adapter, moving the carriage between the upper and lower positions raises and lowers the cargo receptacle relative to the hitch adapter.

2. The cargo carrier as defined in claim 1, wherein the hitch adapter includes a substantially elongated hitch engaging member extending axially with the hitch and the carriage defines a recess extending at least partially upwardly relative to a lower edge portion of the cavity that is in register with the hitch engaging member when the carriage is engaged with the adapter protruding portion, the recess receiving at least part of the hitch adapter thereinto when the carriage is operatively mounted to the hitch adapter.

3. The cargo carrier as defined in claim 2, wherein the carriage also defines an upper aperture leading into the cavity from above, the adapter protruding portion protruding from the cavity through the upper aperture when the carriage is operatively mounted to the hitch adapter.

4. The cargo carrier as defined in claim 2, further comprising a lock selectively lockable for maintaining the adapter protruding portion protruding from the upper aperture.

5. The cargo carrier as defined in claim 1, wherein the hitch adapter includes a hitch engaging member mountable to the trailer hitch receiver and extending from the adapter protruding portion, and wherein the adapter protruding portion includes a substantially vertical tongue.

6. The cargo carrier as defined in claim 5, wherein the substantially vertical tongue defines a substantially planar main portion and a curved upper edge portion extending from the main portion curving out-of-plane relative to the main portion.

7. The cargo carrier as defined in claim 1, wherein the mount also includes a guide rail, the carriage being movable along the guide rail to move between the upper and lower positions.

8. The cargo carrier as defined in claim 7, wherein the guide rail is substantially vertically extending.

9. The cargo carrier as defined in claim 7, wherein the carriage is mounted to the guide rail so as to be slidable therealong.

10. The cargo carrier as defined in claim 9, wherein the guide rail includes a pair of substantially parallel rail members and the carriage includes a pair of collars, each collar being slidably received on a respective one of the rail members.

11. The cargo carrier as defined in claim 7, wherein
   the actuator includes a substantially vertical endless screw substantially vertically fixed relative to the guide rail; and
   the carriage defines a threaded bore, the endless screw being mounted in the threaded bore;
   whereby rotating the endless screw moves the carriage between the upper and lower positions.

12. The cargo carrier as defined in claim 11, wherein the actuator also includes a crank handle operatively coupled to the endless screw for rotating the endless screw when the crank handle is turned.

13. The cargo carrier as defined in claim 1, wherein the cargo receptacle includes a wheeled cabinet.

14. The cargo carrier as defined in claim 13, wherein the wheeled cabinet includes a pair of laterally openable wing doors provided opposed to the mount.

15. The cargo carrier as defined in claim 14, wherein the wheeled cabinet includes a drawer provided below the wing doors.

16. The cargo carrier as defined in claim 1, wherein the cargo receptacle defines a set of substantially horizontal shelves provided one above the others.

17. A method of attaching a cargo carrier having a weight to a hitch adapter mounted to a trailer hitch receiver of a vehicle, the cargo carrier having a mount and a cargo receptacle secured to the mount, the mount including a carriage removably mountable to the hitch adapter, the carriage being movable relative to the cargo receptacle between lower and upper positions, the method comprising:
   positioning the cargo carrier and the vehicle so that the cargo carrier and the hitch adapter are substantially adjacent to each other;
   mounting the carriage to the hitch adapter; and raising the cargo receptacle relative to the carriage by moving the carriage and the cargo receptacle relative to each other so that the carriage gets closer to a lower end of the cargo receptacle;

wherein the hitch adapter defines an adapter protruding portion protruding upwardly and the carriage defines a cavity and a lower aperture leading into the cavity from below;

positioning the cargo carrier and the vehicle includes positioning the cargo carrier and the vehicle such that the lower aperture is above and substantially in register with the adapter protruding portion; and mounting the carriage to the hitch adapter includes lowering the carriage until the adapter protruding portion is at least in part received in the cavity and the carriage and hitch adapter abut against each other vertically so that the hitch adapter supports the carriage and the weight of the cargo carrier.

* * * * *